Figure 1:
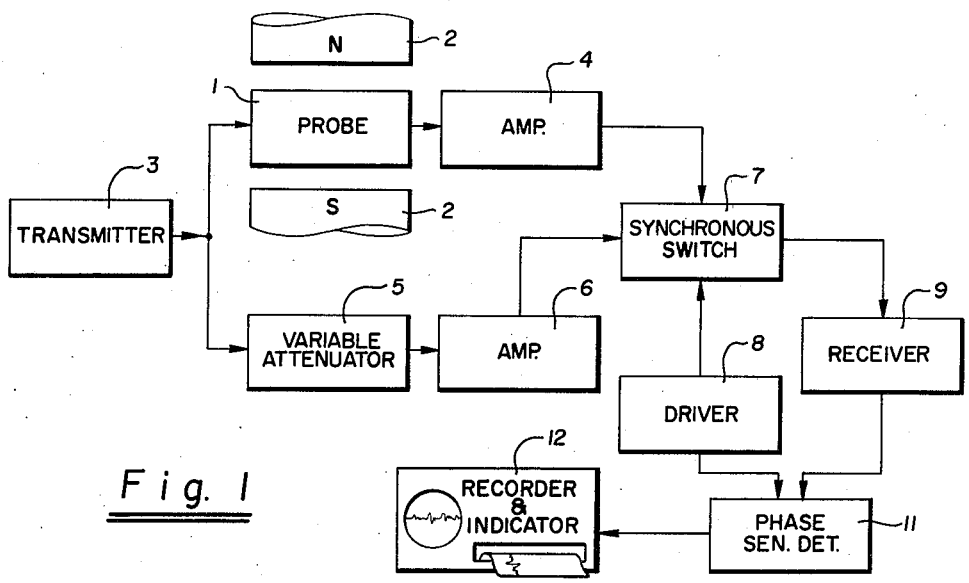

June 12, 1962     J. N. SHOOLERY     3,039,048
GYROMAGNETIC RESONANCE DETECTION METHOD AND APPARATUS
Filed Oct. 14, 1957     2 Sheets-Sheet 1

INVENTOR.
James N. Shoolery
BY
Paul B. Hunter
Attorney

INVENTOR.
James N. Shoolery

United States Patent Office 3,039,048
Patented June 12, 1962

3,039,048
GYROMAGNETIC RESONANCE DETECTION
METHOD AND APPARATUS
James N. Shoolery, Palo Alto, Calif., assignor to Varian
Associates, Palo Alto, Calif., a corporation of California
Filed Oct. 14, 1957, Ser. No. 690,154
11 Claims. (Cl. 324—.5)

The present invention relates in general to gyromagnetic resonance systems and more specifically to a novel method and apparatus for detecting gyromagnetic resonance phenomena. The present invention is useful in that it will provide increased stability in gyromagnetic resonance detection systems such as, for example, those employed in chemical analysis, process control, moisture measurements and the like.

Heretofore a typical gyromagnetic resonance detection system included a transmitter for supplying a signal to the gyromagnetic substance to excite resonance therein. A resonance signal was picked up in a receiver coil and applied to the input of an R.F. amplifier. The output of the amplifier was detected to produce a D.C. signal having a magnitude in variable accordance with gyromagnetic resonance of the substance. In such a system fluctuations in the power output of the transmitter and fluctuations in the gain of the R.F. amplifier show up as undesired variations in the magnitude of the detected D.C. signal and are thus indistinguishable from the desired resonance signals. The result is that sweep speeds faster than desired must be utilized when recording gyromagnetic spectra since the number of such spurious fluctuations encountered is a direct function of time.

The present invention provides a novel method and apparatus for greatly enhancing the time stability of gyromagnetic resonance detection systems. Briefly, the invention includes deriving a first gyromagnetic resonance signal at the Larmor frequency of the sample which is coupled from the transmitter through the gyromagnetic substance in variable accordance with resonance of the substance. A second signal substantially at the Larmor frequency is derived which comprises a sample of the transmitter output. The first and second signals are alternately sampled at a convenient low frequency rate such as, for example, 60 cycles per second and applied to an amplifier and detector. After detection, the low frequency components of the first and second signals are compared to produce a signal in variable accordance with the resonance of the gyromagnetic substance. Using this method of detection, fluctuations in the transmitter power and gain of the R.F. amplifier are canceled to produce an extremely stable gyromagnetic resonance detection system.

The principal object of the present invention is to provide a novel improved gyromagnetic resonance detection system having greatly enhanced time stability.

One feature of the present invention is the provision of means for sampling the output of the transmitter for comparison with the gyromagnetic resonance signal coupled from the transmitter through the gyromagnetic substance at resonance, whereby undesired fluctuations in the output of the transmitter are rendered non-responsive in the output of the resonance detection system.

Another feature of the present invention is the provision of means for alternately applying said first and said second signals to an amplifier and detector means whereby said first and said second signals are amplified by the same means such that fluctuations in the gain of the amplifier are rendered nonresponsive in the output of the resonance detection system.

Another feature of the present invention is the provision of means for comparing said first and said second signals to obtain a third signal in variable accordance with resonance of the gyromagnetic sample whereby fluctuations in the output of the transmitter and the gain of the amplifier are rendered nonresponsive in the output of the resonance detection system.

Figure 2:
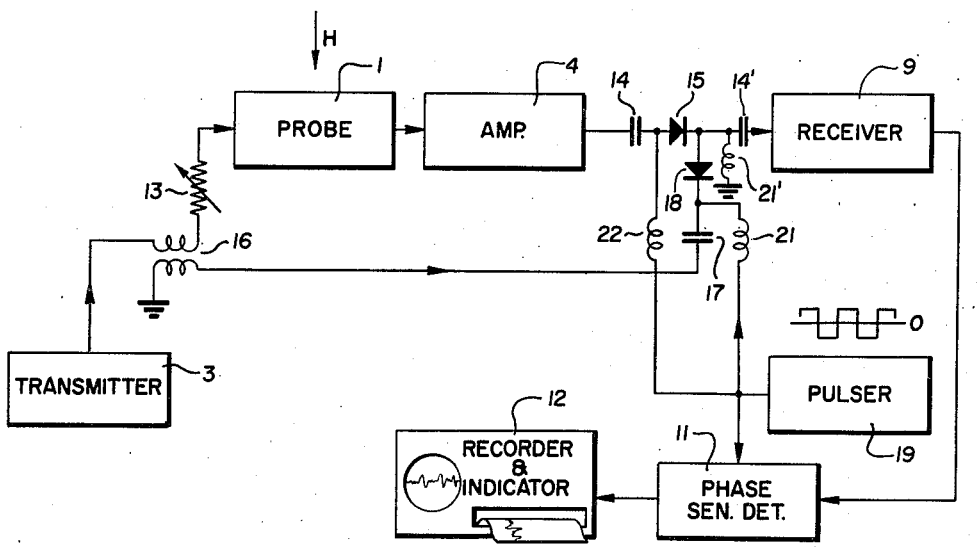
Figure 3:
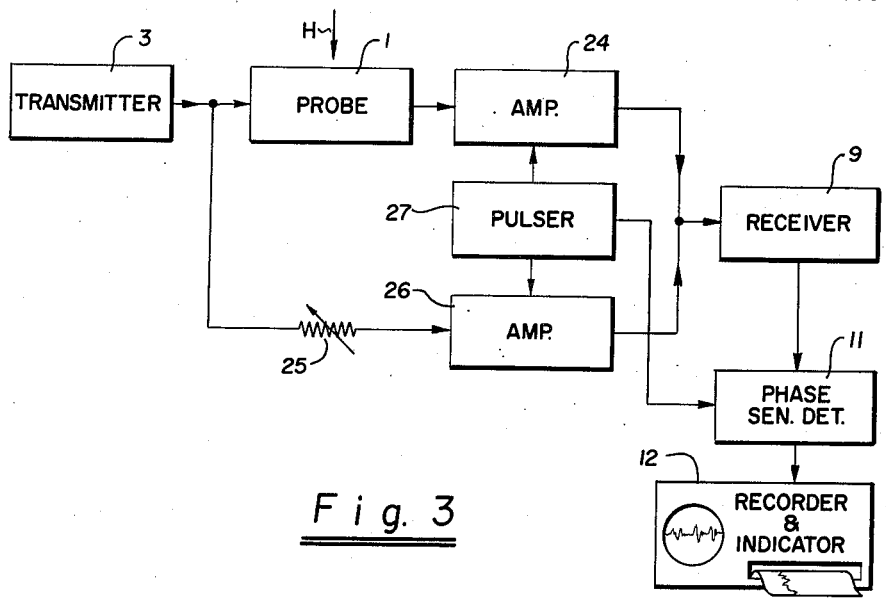
Figure 4:
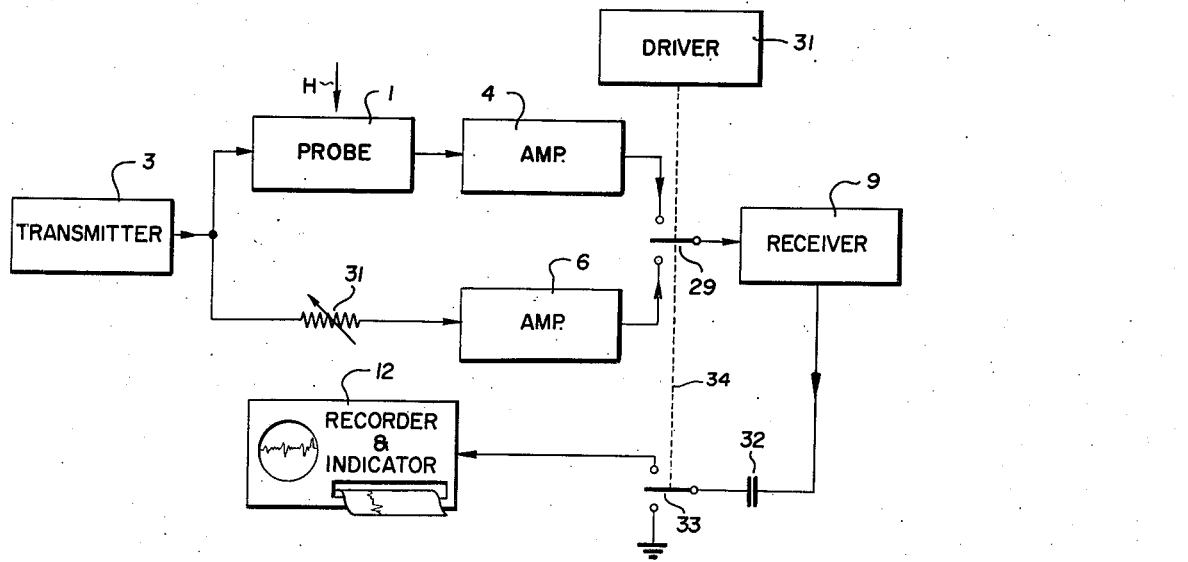

These and other features and advantages of the present invention will be more apparent after a perusal of the following specification taken in connection with the accompanying drawings wherein, FIG. 1 is a schematic block diagram of the novel gyromagnetic resonance detection system of the present invention, FIG. 2 is a schematic block diagram of the novel gyromagnetic resonance detection system of the present invention, FIG. 3 is a schematic block diagram of the novel gyromagnetic resonance detection system of the present invention, and FIG. 4 is a schematic block diagram of the novel gyromagnetic resonance detection system of the present invention.

Referring now to FIG. 1 a sample of matter in which it is desired to detect gyromagnetic resonance, if any, is disposed within a suitable probe assembly 1 which may be, for example, either of the bridge or crossed-coils type. The probe assembly 1 containing the gyromagnetic sample of matter is immersed in a polarizing magnetic field such as, for example, that produced by a permanent magnet 2. A transmitter 3 supplies a first portion of a high frequency signal output to the probe assembly 1 to thereby produce a time varying magnetic field at the Larmor frequency of the gyromagnetic bodies contained within the sample of matter to excite gyromagnetic resonance therein. When gyromagnetic resonance of the sample of matter is obtained, the resonance signal from the probe at the frequency of the transmitter 3 is applied to the input of a pre-amplifier 4 wherein the resonance signal is amplified and then transmitted to one input of a synchronous switch 7.

A second portion of the transmitter output is fed via a variable attenuator 5 and pre-amplifier 6 to the other input of the synchronous switch 7. The synchronous switch 7 is driven via a driver 8 at some convenient low frequency such as, for example, 60 cycles per second and alternately couples the gyromagnetic resonance signal obtained in the output of pre-amplifier 4 and the signal derived directly from the transmitter 3 as found in the output of amplifier 6 to the input of a receiver 9 wherein the R.F. transmitter and resonance signals are first amplified and then detected to produce a low frequency component at the frequency of the synchronous switch 7. The magnitude of the low frequency component of the receiver output signal is a function of the resonance obtained from the gyromagnetic sample of matter under analysis.

The output of the receiver 9 is fed to the input of a phase sensitive detector 11 (such as, for example, that shown by Terman, Electronic and Radio Engineering, fourth edition, 1955, page 1010), wherein it is compared with a signal derived from the driver 8 to produce a D.C. signal in the output of the phase sensitive detector the magnitude of which is a function of the resonance of the sample of matter under investigation. The D.C. signal is then fed to a recorder and indicator 12 wherein the resonance signal is indicated and recorded as desired. When utilizing the novel gyromagnetic detection system as shown and described with regard to FIG. 1 it can be seen that fluctuations in the output of the transmitter 3 will produce like fluctuations in the output of amplifiers 4 and 6 and thus when the amplifier outputs are compared in the phase sensitive detector 11 such fluctuations which have a frequency lower than the switching frequency will be canceled. In addition, it can be seen that undesired fluctuations in the gain of the receiver 9 will produce like fluctuations in alternate sampled signals applied thereto and accordingly when these signals are compared in the phase sensitive detector 11 changes in the gain of the receiver 9 will be rendered nonresponsive in the output of the phase sensitive detector 11.

In operation the variable attenuator 5 is preferably adjusted such that the output from the amplifier 6 is of substantially the same magnitude as leakage signals appearing in the output of amplifier 4 in the absence of a gyromagnetic resonance signal. When the variable attenuator is adjusted in this manner there will be no D.C. component present in the output of the phase sensitive detector 11 as no time varying component will be found in the output of the receiver 9. However, when resonance is obtained in the gyromagnetic sample of matter the coupling between the transmitter 3 and the amplifier 4 is enhanced and the signal applied to the synchronous switch via the probe 1 and amplifier 4 is of substantially greater magnitude than the signal derived from the transmitter 3 via the variable attenuator 5 and amplifier 6. Thus when these two signals are compared in the phase sensitive detector there will be produced a substantial D.C. signal in the output thereof, the magnitude of which is a measure of the strength of the resonance present in the sample of matter under investigation.

Referring now to FIG. 2 there is shown another embodiment of the present invention. The principle of operation of this embodiment is substantially identical to that of FIG. 1 except that this embodiment has the advantage that the switching function is performed by an entirely electrical network without the requirement of moving parts. More specifically, the sample of matter which it is desired to analyze is disposed within the probe assembly 1 and immersed in a polarizing magnetic field H. The time varying magnetic field is derived from the transmitter 3 and supplied to the probe 1 via the variable attenuator 13. The output of the probe 1 is coupled to the input of an amplifier 4 and thence fed to a receiver 9 via a coupling capacitor 14, diode 15 and coupling capacitor 14'. A small portion of the transmitter output is coupled therefrom via a transformer 16 and fed via coupling capacitor 17, diode 18 and coupling capacitor 14' to the input of the receiver 9.

A pulser 19 supplies positive and negative going pulses via R.F. chokes 21 and 22 to terminals positioned intermediate of coupling capacitor 14 and diode 15 and capacitor 17 and diode 18. The pulser 19 also supplies like pulses to one input terminal of the phase sensitive detector 11. An R.F. choke 21' is also provided between the output terminals of the diodes 15 and 18 and ground to furnish a D.C. return path for the pulser 19.

In operation, in the absence of gyromagnetic resonance in the sample under investigation disposed within the probe 1, the signal coupled through the probe is adjusted in amplitude via variable attenuator 13 until it has the same amplitude, in the input of receiver 9, as the signal derived via the transformer 16 and fed via coupling capacitor 17 and diode 18 to the input of receiver 9. When the pulser 19 is supplying a positive pulse to the anode of diode 15 and the cathode of diode 18, diode 15 will be conductive and diode 18 will be nonconductive. When diode 15 is conductive the output of the probe is coupled directly into the input of receiver 9, concurrently the sample portion of the output of the transmitter 3 derived via the transformer 16 is effectively blocked from being responsive in the input of receiver 9 due to the nonconductive state of the diode 18. However, when the pulser 19 supplies a negative going pulse to the cathode of diode 18 and the anode of diode 15 the sample portion of the output of the transmitter 3 is coupled directly to the input of the receiver 9 and due to the nonconductive state of diode 15 the output of the probe is effectively decoupled from the receiver 9.

In this manner the receiver 9 samples first the signal derived through the probe 1 and then secondly the signal derived from the transmitter 3. The alternate sampled signals are then amplified and detected in receiver 9 and fed to one input terminal of the phase sensitive detector 11 wherein they are compared to produce a signal in variable accordance with resonance of the gyromagnetic sample, said signal being fed to the indicator and recorder 12 wherein it is indicated and recorded, as desired.

Referring now to FIG. 3 there is shown another embodiment of the present invention. In this embodiment the synchronous switching function of the foregoing embodiments has been incorporated into the amplifier stages of the system. More specifically, a sample of matter which it is desired to investigate is disposed within a suitable probe assembly 1 and immersed in a polarizing magnetic field H. A time varying magnetic field substantially at the Larmor frequency of the gyromagnetic bodies within the sample, if any, is applied to the probe assembly 1 via a transmitter 3. The output of the probe assembly 1 is fed to the input of an amplifier 24 and thence to the input of the receiver 9. Concurrently therewith a portion of the output of the transmitter 3 is coupled therefrom and fed via variable attenuator 25 and amplifier 26 to the input of receiver 9. A pulser 27 simultaneously applies pulses to both amplifier 24 and amplifier 26 of such a polarity such as to render one of the amplifiers operative and the other amplifier inoperative. In this manner amplifiers 24 and 26 alternate from the operative to the inoperative state in variable accordance with pulses derived from pulser 27. A signal is derived from the pulser 27 at the pulsing frequency and fed to one input terminal of the phase sensitive detector 11.

In operation the variable attenuator 25 is adjusted such that in the absence of resonance in the probe 1 the signals coupled through the probe and through the variable attenuator 25 and amplifier 26 have substantially identical amplitudes when received in the input of receiver 9. Within the receiver 9 the alternate signals are amplified and detected and the output thereof is applied to one input terminal of the phase sensitive detector 11. Within the phase sensitive detector 11 the signals derived from the probe and from the transmitter 3 are compared to produce a D.C. signal in variable accordance with the resonance of the gyromagnetic bodies, if any, contained within the probe 1. This D.C. signal is then fed to the indicator and recorder 12 for recording and indicating as desired.

Referring now to FIG. 4 there is shown another embodiment of the present invention. This embodiment is substantially identical to that of FIG. 1 with the exception that the phase sensitive detector 11 has been replaced by a mechanical analog. More specifically, a sample of matter which it is desired to investigate is suitably disposed within a probe assembly 1 and immersed in a polarizing magnetic field H. The transmitter 3 supplies to the probe assembly 1 a time varying magnetic field substantially at the Larmor frequency of the gyromagnetic bodies, if any, contained within the sample of matter under analysis. The output of the probe assembly 1 is fed to the input of the amplifier 4 and thence to one terminal of a two position switch 29. A portion of the transmitter output signal is derived therefrom and fed via variable attenuator 31 and amplifier 6 to another terminal of the two position switch 29. The driver 31 which may be, for example, a motor or other suitable electromechanical device serves to alternately connect the switch blade of switch 29 to one or the other of the two terminals thereof. The output of the switch 29 is then fed to the input of receiver 9.

Within the receiver 9 the signals applied thereto are amplified and detected and the A.C. output thereof, if any, is fed via coupling capacitor 32 to the switch blade of a two position switch 33. The two position switch 33 is operated in synchronism with the similar switch 29 as by, for example, a mechanical linkage 34 therebetween. One terminal of the synchronous switch 33 is connected to ground and the other terminal is connected to the input of the indicator and recorder 12, which preferably has a time constant long compared to the recorder open circuit switch time. Due to the synchronism between the switch 29 and the switch 33, switch 33 serves to subtract the positive and negative portions of the applied A.C. signal to produce a D.C. voltage, the magnitude and sense of which is equal to the difference between the amplitude of the R.F. signal derived via the probe 1 and that derived from the transmitter 3 via the variable attenuator 31 and amplifier 6. The difference D.C. signal is then fed to an indicator and recorder 12 for indicating and recording gyromagnetic resonance of the sample under analysis.

In operation the variable attenuator 31 is preferably adjusted such that the amplitude of the R.F. signals present at both terminals of the switch 29 are of equal amplitude in the absence of resonance. When this is the case the D.C. signal fed to the indicator and recorder 12 will be of zero amplitude indicating no resonance. However, upon resonance of the gyromagnetic sample of matter contained within the probe 1 a larger signal will be coupled though the probe to produce a variable amplitude low frequency signal at the switching frequency at the switch 33. Switch 33 serves as a synchronous rectifier with respect to ground and accordingly a D.C. signal will appear across the input terminals of the indicator and recorder 12 having an amplitude and phase in variable accordance with the gyromagnetic resonance of the sample under analysis. This gyromagnetic resonance signal is then indicated and recorded in the indicator and recorder 12, as desired.

The foregoing embodiments of the present invention have been described in such a manner that the two R.F. signals, one coupled through the probe and the other coupled through the variable attenuator path or derived simply directly from the transmitter 3, were of equal magnitude, in the absence of resonance. Although this is the preferred embodiment it is not a requirement and the amplitudes of the R.F. signal derived through the probe 1 and the signal bypassing the probe be of equal amplitude in the input of receiver 9. The only additional complication that this adds is that, in the absence of resonance, there is a D.C. signal fed to the indicator and recorder which varies in the presence of resonance.

Moreover the foregoing embodiments have been described utilizing a type of phase sensitive detector for comparing the amplitudes of the sampled signals present in the input of the receiver 9. Although this is a preferred method for comparing these signals because it yields the proper sense as well as magnitude of the resonance signal it is not necessary. It is readily apparent that the magnitude of the A.C. component in the output of the receiver is a measure of the difference in amplitude of the sampled signals fed thereto. Accordingly the amplitude of the A.C. component may be measured directly as by, for example, an A.C. rectifier which feeds its output to the indicator and recorder 12.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. The method for detecting gyromagnetic resonance phenomena comprising the steps of exciting gyromagnetic resonance in a sample of matter by applying a time varying magnetic field to the sample of matter substantially at the Larmor frequency of the sample, deriving a first signal at the Larmor frequency of the sample from the sample of matter in variable accordance with gyromagnetic resonance therein, deriving a second signal substantially at the Larmor frequency of the sample in variable accordance with the applied time varying magnetic field and being substantially free of fluctuations due to resonance of the sample, and alternately sampling the first and second signals to obtain a third signal time varying substantially at the Larmor frequency and having fluctuations therein in variable accordance with gyromagnetic resonance of the sample of matter.

2. The method according to claim 1 including, detecting the amplitude fluctuations of the third time varying signal to give a stable indication of gyromagnetic resonance of the sample under investigation.

3. The method according to claim 2 including, the step of adding the detected amplitude fluctuations of the third time varying signal to a signal derived in variable accordance with the frequency of the sampling of the magnitudes of the first and second signals to produce a fourth signal having a sense and magnitude in variable accordance with gyromagnetic resonance of the sample of matter under investigation.

4. The method according to claim 2 including, the step of synchronously subtracting the positive and negative portions of the fluctuating third time varying signal in synchronism with the frequency of the alternate sampling of the magnitudes of the first and second signals whereby a stable D.C. signal is produced in variable accordance with gyromagnetic resonance of the sample of matter under investigation.

5. Apparatus for detecting gyromagnetic resonance phenomenon comprising means for exciting gyromagnetic resonance in a sample of matter by applying a time varying magnetic field to the sample substantially at the Larmor frequency of the sample, means for deriving a first signal at the Larmor frequency of the sample from the sample of matter in variable accordance with gyromagnetic resonance therein, means for deriving a second signal in variable accordance with the applied time varying magnetic field approximately at the Larmor frequency of the sample and being free of fluctuations due to resonance of the sample, and means for alternately sampling the magnitude of the first and second signals to obtain a third signal substantially at the Larmor frequency of the sample and having lower frequency fluctuations therein in variable accordance with gyromagnetic resonance of the sample of matter.

6. The apparatus according to claim 5 including, means for detecting the amplitude fluctuation of the third time varying signal to give a stable indication of gyromagnetic resonance of the sample of matter under investigation.

7. The apparatus according to claim 6 wherein the means for alternately sampling the magnitude of said first and second signals to produce a third time varying signal comprises a switch means operated at a certain sampling frequency.

8. The apparatus according to claim 7 wherein said switch means includes a first mechanical switch.

9. The apparatus according to claim 7 wherein said switch means includes electrical means for alternately gating the first and second signals.

10. The apparatus according to claim 6 including, a phase sensitive detecting means for comparing the fluctuation of the third time varying signal with a signal substantially at the sampling frequency whereby a fourth signal is produced in variable accordance with the gyromagnetic resonance of the sample of matter under investigation.

11. The apparatus according to claim 8 wherein said detecting means for detecting the amplitude fluctuations of the third time varying signal includes a second mechanical switching means operated in synchronism with said first mechanical switch whereby a D.C. signal is produced in variable accordance with the gyromagnetic resonance of the sample of matter under investigation.

References Cited in the file of this patent

FOREIGN PATENTS

| | | |
|---|---|---|
| 542,191 | Belgium | Nov. 14, 1955 |
| 1,131,107 | France | Oct. 15, 1956 |

OTHER REFERENCES

Baker: Physical Review, vol. 25, No. 4, April 1954, pp. 390, 391.

Volkoff et al.: Canadian Journal of Physics, vol. 30, No. 3, 1952, pp. 270 to 289 inclusive.

Mitchell et al.: The Review of Scientific Instruments, vol. 28, No. 8, August 1957, pp. 624 to 628.